(12) United States Patent
Fan (10) Patent No.: US 11,763,511 B2
(45) Date of Patent: Sep. 19, 2023

(54) METHODS AND APPARATUSES OF DISPLAYING PRESET ANIMATION EFFECT IMAGE, ELECTRONIC DEVICES AND STORAGE MEDIA

(71) Applicant: BOE Technology Group Co., Ltd., Beijing (CN)

(72) Inventor: Haijun Fan, Beijing (CN)

(73) Assignee: BOE Technology Group Co., Ltd., Beijing (CN)

( * ) Notice: Subject to any disclaimer, the term of this patent is extended or adjusted under 35 U.S.C. 154(b) by 154 days.

(21) Appl. No.: 17/459,767

(22) Filed: Aug. 27, 2021

(65) Prior Publication Data
US 2022/0130095 A1 Apr. 28, 2022

(30) Foreign Application Priority Data

Oct. 28, 2020 (CN) .......................... 202011173831.0

(51) Int. Cl.
*G06T 13/80* (2011.01)
(52) U.S. Cl.
CPC .......... *G06T 13/80* (2013.01); *G06T 2213/12* (2013.01)
(58) Field of Classification Search
CPC ..... G06T 13/80; G06T 2213/12; G06T 13/00; G06F 3/0481; G06F 3/04842; G06F 3/04847
See application file for complete search history.

(56) References Cited

U.S. PATENT DOCUMENTS

| 2005/0225553 | A1* | 10/2005 | Chi | G06T 7/215 345/474 |
| 2007/0177022 | A1 | 8/2007 | Mowry | |
| 2010/0039557 | A1 | 2/2010 | Mori et al. | |
| 2015/0348280 | A1* | 12/2015 | Oriol | G06T 7/40 345/582 |
| 2017/0111591 | A1 | 4/2017 | Ma et al. | |
| 2020/0037043 | A1* | 1/2020 | Phillips | H04N 21/6587 |

FOREIGN PATENT DOCUMENTS

| CN | 101518066 A | 8/2009 | |
| CN | 104767910 A | 7/2015 | |
| CN | 108596839 A | 9/2018 | |
| CN | 109118556 A | 1/2019 | |
| EP | 0280316 A2 * | 8/1988 | .......... G06T 3/4084 |
| EP | 0399663 A1 * | 11/1990 | .......... G06T 3/0025 |

OTHER PUBLICATIONS

CN202011173831.0 first office action.

* cited by examiner

*Primary Examiner* — King Y Poon
*Assistant Examiner* — Vincent Peren
(74) *Attorney, Agent, or Firm* — IPRO, PLLC (57) ABSTRACT

The present disclosure provides a method and apparatus of displaying an image, an electronic device and a storage medium. The method includes: obtaining a preset number of candidate sub-images by segmenting a to-be-displayed first candidate image; assigning each of the candidate sub-images to a corresponding first image sub-template in a preset first image template sequentially, where a number of the first image sub-templates is equal to a number of the candidate sub-images; adjusting each of the first image sub-templates in the first image template such that the first candidate image displays a preset animation effect, where the preset animation effect is obtained from configuration information of an electronic device.

15 Claims, 4 Drawing Sheets

| 11 | 12 | 13 | 14 | 15 | 16 | 17 | 18 |
|----|----|----|----|----|----|----|----|
| 21 | 22 | 23 | 24 | 25 | 26 | 27 | 28 |
| 31 | 32 | 33 | 34 | 35 | 36 | 37 | 38 |
| 41 | 42 | 43 | 44 | 45 | 46 | 47 | 48 |

METHODS AND APPARATUSES OF DISPLAYING PRESET ANIMATION EFFECT IMAGE, ELECTRONIC DEVICES AND STORAGE MEDIA

CROSS REFERENCE TO RELATED APPLICATIONS

This application claims priority to Chinese Patent Application No. 202011173831.0 entitled "METHODS AND APPARATUSES OF DISPLAYING IMAGE, ELECTRONIC DEVICES AND STORAGE MEDIA" filed on Oct. 28, 2020, the entire content of which is incorporated herein by reference.

TECHNICAL FIELD

The present disclosure relates to the field of control technologies, in particular to methods and apparatuses of displaying an image, electronic devices and storage media.

BACKGROUND

At present, image playing effect generally refers to a special effect realized by performing control such as moving, scaling, rotation and transparency change on an entire image. For example, materials may be made into GIFs or videos by using an arts making software like Photoshop. However, once an image is determined, such image cannot be replaced freely and thus has to be re-made, leading to limited application scope and higher making costs.

SUMMARY

The present disclosure provides methods and apparatuses of displaying an image, electronic devices and storage media so as to solve the shortcomings of the prior art.

According to a first aspect of an embodiment of the present disclosure, provided is a method of displaying an image, including: obtaining a preset number of candidate sub-images by segmenting a to-be-displayed first candidate image; assigning each of the candidate sub-images to a corresponding first image sub-template in a preset first image template sequentially, where a number of the first image sub-templates is equal to a number of the candidate sub-images; adjusting each of the first image sub-templates in the first image template such that the first candidate image displays a preset animation effect, where the preset animation effect is obtained from configuration information of an electronic device.

Optionally, adjusting each of the first image sub-templates in the first image template includes: assigning the candidate sub-image in each of the first image sub-templates in the first image template to a corresponding second image sub-template in a preset second image template sequentially, where each of the second image sub-templates in the second image template corresponds one-to-one to each of the first image sub-templates in the first image template; obtaining an adjustment sequence and a display parameter of each of the second image sub-templates in the second image template based on the preset animation effect; adjusting the display parameter of each of the second image sub-templates in the second image template sequentially based on the adjustment sequence.

Optionally, assigning the candidate sub-image in each of the first image sub-templates in the first image template to the corresponding second image sub-template in the preset second image template sequentially includes: adjusting each of the second image sub-templates in the second image template to a display state; assigning the candidate sub-image in each of the first image sub-templates in the first image template to the corresponding second image sub-template in the second image template sequentially.

Optionally, after assigning the candidate sub-image in each of the first image sub-templates in the first image template to the corresponding second image sub-template in the second image template sequentially, the method further includes: obtaining a to-be-displayed second candidate image; segmenting the second candidate image to assign a preset number of obtained candidate sub-images to corresponding first image sub-templates in the first image template sequentially.

Optionally, the display parameter includes at least one of a scaling coefficient, a display coordinate and a transparency.

Optionally, the adjustment sequence includes at least one of: adjusting based on a row sequence, adjusting based on a column sequence, adjusting based on a zigzag sequence, simultaneously adjusting based on a sequence of from left and right toward middle, moving out of a display boundary from a current position, adjusting based on a sequence of from one vertex corner to an opposite corner, adjusting and moving out of the display boundary simultaneously.

According to a second aspect of an embodiment of the present disclosure, provided is an apparatus of displaying an image, including: an image obtaining module, configured to obtain a preset number of candidate sub-images by segmenting a to-be-displayed first candidate image; an image assigning module, configured to assign each of the candidate sub-images to a corresponding first image sub-template in a preset first image template sequentially, where a number of the first image sub-templates is equal to a number of the candidate sub-images; a template adjusting module, configured to adjust each of the first image sub-templates in the first image template such that the first candidate image displays a preset animation effect, where the preset animation effect is obtained from configuration information of an electronic device.

Optionally, the template adjusting module includes: a sub-image assigning unit, configured to assign the candidate sub-image in each of the first image sub-templates in the first image template to a corresponding second image sub-template in a preset second image template sequentially, where each of the second image sub-templates in the second image template corresponds one-to-one to each of the first image sub-templates in the first image template; a sequence and parameter obtaining unit, configured to obtain an adjustment sequence and a display parameter of each of the second image sub-templates in the second image template based on the preset animation effect; and a display parameter adjusting unit, configured to adjust the display parameter of each of the second image sub-templates in the second image template sequentially based on the adjustment sequence.

Optionally, the sub-image assigning unit includes: a display state adjusting sub-unit, configured to adjust each of the second image sub-templates in the second image template to a display state; a sub-image assigning sub-unit, configured to assign the candidate sub-image in each of the first image sub-templates in the first image template to the corresponding second image sub-template in the second image template sequentially.

Optionally, the apparatus further includes: the image obtaining module, further configured to obtain a to-be-displayed second candidate image; and the image assigning module, further configured to segment the second candidate image and assign a preset number of obtained candidate sub-images to corresponding first image sub-templates in the first image template sequentially.

Optionally, the display parameter includes at least one of a scaling coefficient, a display coordinate and a transparency.

Optionally, the adjustment sequence includes at least one of: adjusting based on a row sequence, adjusting based on a column sequence, adjusting based on a zigzag sequence, simultaneously adjusting based on a sequence of from left and right toward middle, moving out of a display boundary from a current position, adjusting based on a sequence of from one vertex corner to an opposite corner, adjusting and moving out of the display boundary simultaneously.

According to a third aspect of an embodiment of the present disclosure, provided is an electronic device, including: a processor, and a memory storing computer programs executable by the processor, where the processor is configured to execute the computer programs in the memory to implement the above methods.

According to a fourth aspect of an embodiment of the present disclosure, provided is a non-volatile computer readable storage medium, where executable computer programs stored in the storage medium are executed by a processor to implement the above methods.

The technical solution according to the embodiments of the present disclosure may include the following beneficial effects. As known from the above embodiments, in the embodiments of the present disclosure, a preset number of candidate sub-images may be obtained by segmenting a to-be-displayed first candidate image. And, each of the candidate sub-images is assigned to a corresponding first image sub-template in a preset first image template sequentially, where a number of the first image sub-templates is equal to a number of the candidate sub-images. Then, each of the first image sub-templates in the first image template is adjusted such that the first candidate image displays a preset animation effect. Therefore, in this embodiment, the first candidate image can be replaced freely and an animation effect of the candidate image can be selected, thus reducing making costs, expanding application scope, and improving user experiences.

It should be understood that the above general descriptions and subsequent detailed descriptions are merely illustrative and explanatory and shall not be intended to limit the present disclosure.

BRIEF DESCRIPTION OF DRAWINGS

The accompanying drawings, which are incorporated in and constitute a part of the present description, illustrate examples consistent with the present disclosure and serve to explain the principles of the present disclosure together with the description.

DETAILED DESCRIPTION

Exemplary embodiments will be described in detail herein with the examples thereof expressed in the drawings. When the following descriptions involve the drawings, like numerals in different drawings represent like or similar elements unless stated otherwise. The implementations described in the following exemplary embodiments do not represent all embodiments consistent with the present disclosure. On the contrary, they are merely examples of apparatuses and methods consistent with some aspects of the present disclosure described in detail in the appended claims.

Figure 1:
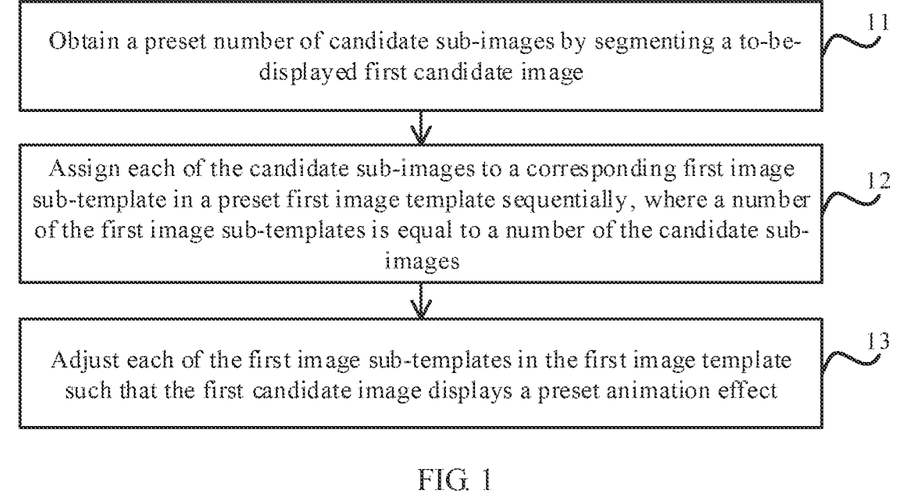
FIG. 1 is a flowchart of a method of displaying an image according to an embodiment of the present disclosure.
Figure 2:
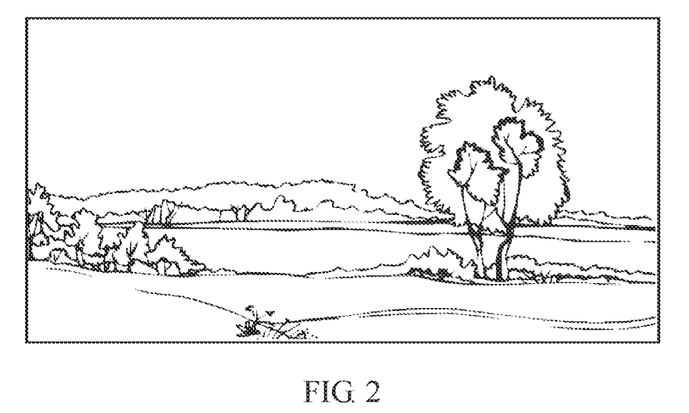
FIG. 2 is a schematic diagram of obtaining a first candidate image according to an embodiment of the present disclosure.

An embodiment of the present disclosure provides a method of displaying an image, which may be applied to an electronic device. The electronic device may include but not limited to: a smart phone, a tablet computer, and an advertisement display screen and the like. The electronic device may display a user-selected image which is referred to as a candidate image hereinafter. FIG. 1 is a flowchart of a method of displaying an image according to an embodiment of the present disclosure. As shown in FIG. 1, the method includes steps 11-13.

At step 11, a preset number of candidate sub-images are obtained by segmenting a to-be-displayed first candidate image.

For example, the electronic device may pre-store at least one image to be displayed, and the at least one image may be stored in a specified position, for example, in a local memory. In a case of playing, the electronic device may read a candidate image from the specified position, where the candidate image is referred to as a first candidate image to distinguish from subsequent second candidate image.

For example, the electronic device may obtain a preset number of candidate sub-images by performing segmentation, for example, uniform segmentation, for the above first candidate image. The preset number may be set to, for example, 4*8=32 according to actual scenario, such that the first candidate image shown in FIG. 1 may be segmented into 32 candidate sub-images shown in FIG. 3.

At step 12, each of the candidate sub-images is assigned to a corresponding first image sub-template in a preset first image template sequentially, where a number of the first image sub-templates is equal to a number of the candidate sub-images.

For example, the electronic device may store preset image templates including the first image template and a second image template, which are overlapped. Each of the first image sub-templates in the first image template corresponds one-to-one to each of the second image sub-templates in the second image template. And a number of the first image sub-templates in the first image template is equal to a number of the candidate sub-images in the first candidate image.

Figure 4A:
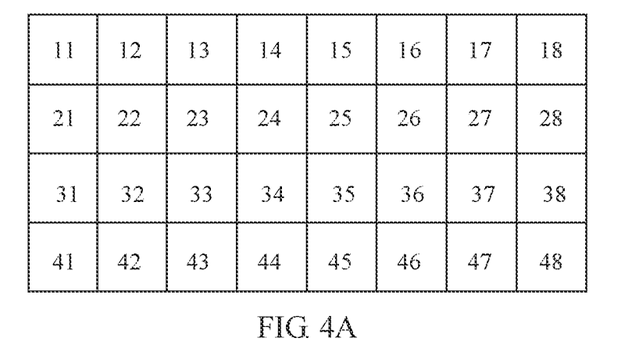
FIG. 4A is a schematic diagram of a preset first image template according to an embodiment of the present disclosure.
Figure 4B:
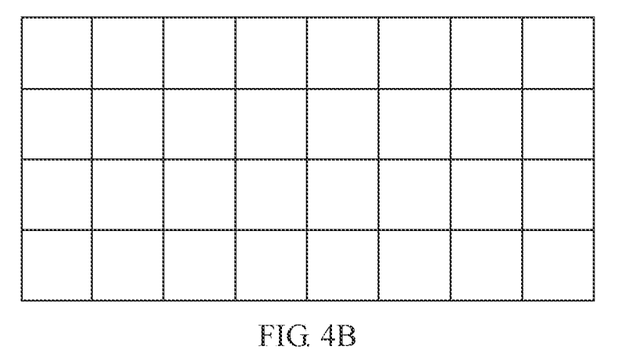
FIG. 4B is a schematic diagram of a preset second image template according to an embodiment of the present disclosure.

For example, two exactly same image templates may be set as shown in FIGS. 4A and 4B. Each image template includes a preset number of image sub-templates. The two image templates shown in FIGS. 4A and 4B may be overlapped, and the two image templates are the first image template and the second image template.

It is noted that the first image template and the second image template are different only in position. Taking the first image template as an example, a gap present between two adjacent first image sub-templates in the first image template shown in FIG. 4A is used only to facilitate reading and understanding the technical solution of the present disclosure. In an actual application, there is no gap between two adjacent first image sub-templates. Correspondingly, during a process of adjusting an image based on the first image template and/or the second image template subsequently, a gap between two adjacent candidate sub-images in a candidate image is used only to facilitate descriptions and the gap actually does not exist.

Figure 3:
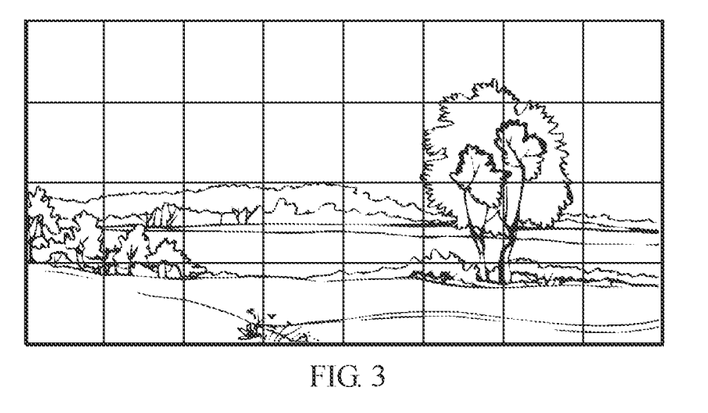
FIG. 3 is an effect diagram of segmenting a first candidate image according to an embodiment of the present disclosure.

It is understood that the electronic device may segment the first candidate image in the same layout as the first image sub-templates of the first image template when segmenting the first candidate image at step 11. The segmentation effect is as shown in FIG. 3.

Figure 5:
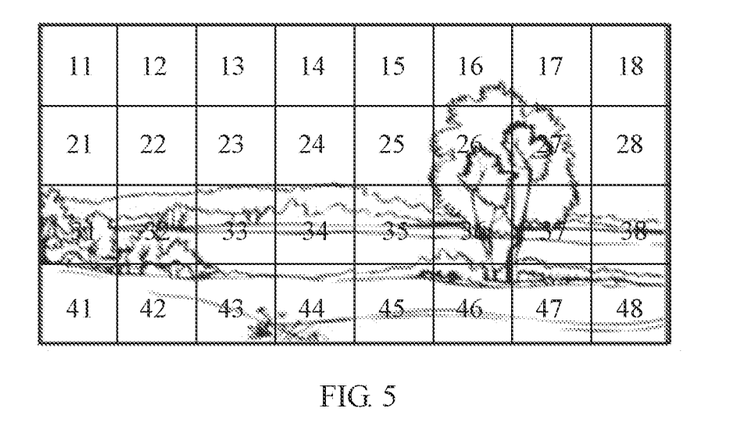
FIG. 5 is a schematic diagram of segmenting a first candidate image according to an embodiment of the present disclosure.

The electronic device may assign each candidate sub-image in the first candidate image to a corresponding first image sub-template in the first image template. For example, the effect shown in FIG. 5 may be obtained by assigning the candidate sub-images in FIG. 3 to the first image sub-templates in the first image template in FIG. 4A respectively.

At step 13, each of the first image sub-templates in the first image template is adjusted, such that the first candidate image displays a preset animation effect, where the preset animation effect is obtained from configuration information of an electronic device.

Figure 6:
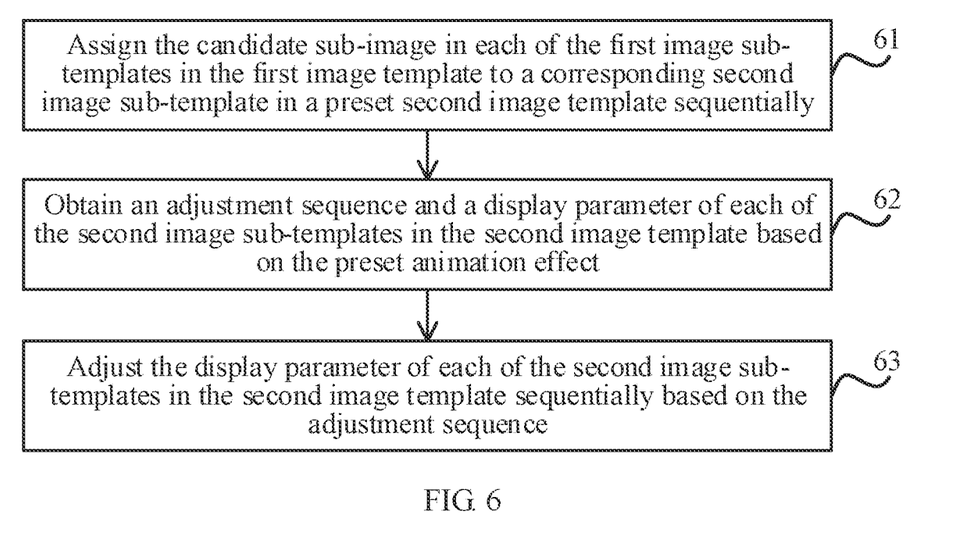
FIG. 6 is a flowchart of a method of displaying an image according to an embodiment of the present disclosure.

In an embodiment of the present disclosure, the electronic device may adjust each first image sub-template in the first image template as shown in FIG. 6. At step 61, the electronic device may assign the candidate sub-image in each of the first image sub-templates in the first image template to a corresponding second image sub-template in a preset second image template sequentially. In an example, the second image template defaults to be in an off state, i.e. in a non-display state. The electronic device may adjust the second image template to an on state, i.e. a display state, and assign the candidate sub-image in each first image sub-template in the first image template to the corresponding second image sub-template in the second image template sequentially.

At step 62, the electronic device may pre-store a plurality of animation effects, and obtain a user-preset animation effect according to configuration information. Furthermore, the electronic device may obtain an adjustment sequence and a display parameter of each of the second image sub-templates in the second image template based on the preset animation effect. The display parameter includes at least one of a scaling coefficient, a display coordinate and a transparency. And the adjustment sequence includes at least one of: adjusting based on a row sequence, adjusting based on a column sequence, adjusting based on a zigzag sequence, simultaneously adjusting based on a sequence of from left and right toward middle, moving out of a display boundary from a current position based on a row sequence or a column sequence, adjusting based on a sequence of from one vertex corner to an opposite corner, adjusting and moving out of the display boundary simultaneously. It is understood that the display parameter and the adjustment sequence may be selected according to actual scenario so as to combine different animation effects.

In an example, the animation effect may include but not limited to the following aspects.

1. Scaling down each image sub-template sequentially based on a row sequence or a column sequence includes: adjusting the scaling coefficient of the image sub-template to gradually decrease to 0, that is, one scaled-down picture is made for each image sub-template. A time interval for adjusting two adjacent image sub-templates may be set to, for example, 0.01-10 seconds. Further, each image sub-template may be adjusted sequentially based on a row sequence or a column sequence.
2. Gradually flipping and vanishing each image sub-template sequentially based on a row sequence or a column sequence includes: rotating an x coordinate of each image sub-template to 90 degrees based on a row sequence; or, rotating a y coordinate of each image sub-template to 90 degrees based on a column sequence.
3. Gradually vanishing each image sub-template sequentially based on a row sequence or a column sequence includes: gradually changing the transparency of each image sub-template to 0 based on a row sequence or a column sequence, so as to achieve a vanishing effect.
4. Dividing various image sub-templates into two groups and moving them out of a boundary of the two groups to vanish includes: dividing 32 image sub-templates into left and right groups, and then gradually moving the left group rightwards and gradually moving the right group leftwards until the two groups move out of the boundary to vanish.
5. Each image sub-template is moved gradually out of the display boundary to vanish sequentially based on a row sequence or a column sequence.
6. The scaling coefficient of the image sub-template is gradually reduced to 0 sequentially based on a row sequence or a column sequence, and a time for this reduction process may be set to, for example, 0.02 seconds. At the same time, one particle effect, for example, an explosion effect, is played at a vanishing position of the image sub-template.
7. The scaling coefficients of an entire row or column of image sub-templates are gradually reduced to 0 sequentially, and a time interval for adjusting two adjacent rows or columns may be set to, for example, 0.02 seconds, so as to achieve the effect of vanishing one row after another or one column after another.
8. Gradually vanishing based on a sequence of from one vertex corner to an opposite corner includes: gradually vanishing from the upper left corner to the lower right corner or from the lower left corner to the upper right corner, and gradually vanishing from the upper right corner to the lower left corner or from the lower right corner to the upper left corner.
9. Each image sub-template swings left and right or randomly based on a preset frequency and at the same time or subsequently moves entirely downwardly out of the display boundary, so as to achieve the effect of shaking off an object.
10. The scaling coefficient of each image sub-template is reduced sequentially to 0 based on row in a zigzag sequence, and at the same time, there is one small car icon moving along a path of the scaling sequence of the candidate sub-image, so as to achieve the effect of taking away image by the car.

It is noted that if the electronic device does not display the above first candidate image by full screen, a display scope may be preset to prevent the animation effect from affecting an un-displayed region.

At step 63, the electronic device adjusts the display parameter of each of the second image sub-templates in the second image template sequentially based on the adjustment sequence.

Figure 7:
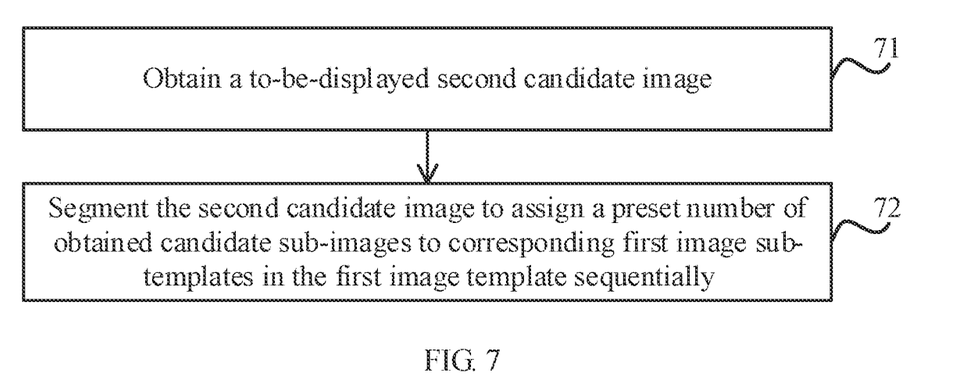
FIG. 7 is a flowchart of a method of displaying an image according to another embodiment of the present disclosure.

In an embodiment, as shown in FIG. 7, at step 71, the electronic device further obtains another to-be-displayed candidate image, i.e. a second candidate image. At step 72, the second candidate image is segmented as shown in steps 11 and 12 to assign a preset number of obtained candidate sub-images to corresponding first image sub-templates in the first image template sequentially. In this way, preparation is made to display a next candidate image.

It is noted that the embodiment shown in FIG. 7 may be carried out immediately after step 12 or in synchronization with step 12, so as to achieve the effect of removing the first candidate image from the second candidate image by adopting the preset animation effect.

In the embodiments of the present disclosure, a preset number of candidate sub-images may be obtained by segmenting a to-be-displayed first candidate image. And, each of the candidate sub-images is assigned to a corresponding first image sub-template in a preset first image template sequentially, where a number of the first image sub-templates is equal to a number of the candidate sub-images. Then, each of the first image sub-templates in the first image template is adjusted such that the first candidate image displays a preset animation effect. Therefore, in this embodiment, the first candidate image can be replaced freely and an animation effect of the candidate image can be selected, thus reducing making costs, expanding application scope, and improving user experiences.

The flow of the method of displaying an image is described below in combination with a use scenario of a three-dimensional game engine Unity, which specifically includes the following: firstly, the electronic device runs the three-dimensional game engine Unity to read a first candidate image, and traverses the first candidate image via a UI interface UnityEngie.UI. Sprite.Create, and segments the first candidate image into 4*8 candidate sub-images.

Image templates are preset in the electronic device, that is, images of 4*8 image templates Unity are edited to form one first image template; at the same time, another image template, i.e. a second image template, is set and then the first image template and the second image template are overlapped together.

Next, the electronic device loads the candidate sub-images obtained by segmentation. The electronic device loads all candidate sub-images under a software external specified catalogue and then traverses all candidate sub-images and stores them in a dictionary based on their sequential numbers. Continuing taking 4*8 candidate sub-images as an example, the candidate sub-images obtained by segmentation are traversed in codes which are illustratively shown below:

Sprite.Create(mtexture,new Rect(new Vector2
 (texWidth/8*column,texHeight/4*row),new Vector2(texWidth/8,texHeight/4)),new Vector2(0, 0));

wherein Sprite.Create( ) is a UI interface of the Unity engine, and Rect is a rectangular interface of the Unity engine:

mtexture refers to a particular candidate sub-image loaded;

texWidth refers to a width of a candidate sub-image, and
 texHeight refers to a height of a candidate sub-image:
 A value of the column is 0-7, and a value of the row is 0-3.
 Each candidate sub-image has a width of texWidth/8 and a height of texHeight/4.

A regional position of each candidate sub-image corresponding to the first candidate image is:

new Vector2(texWidth/8*column,texHeight/4*row).

For a plurality of candidate sub-images after segmentation of each first candidate image, a raw image region corresponding to a first candidate sub-image is:

new Rect(new Vector2(0,0),new Vector2(texWidth/8, texHeight/4)).

A raw image region corresponding to a second candidate sub-image is:

newRect(new Vector2(texWidth/8,texHeight/4), new Vector2(texWidth/8,texHeight/4)).

Next, the electronic device may assign the candidate sub-images stored in the dictionary to the corresponding first image sub-templates in the first image template respectively based on a sequence (row sequence or column sequence).

Then, in a case of playing, the edited first image template in a scenario is traversed based on row or column. For each first image sub-template in the first image template, a candidate sub-image stored in the dictionary is obtained according to the serial numbers and row and column values of the first candidate image and then directly assigned to the first image sub-template.

Finally, each first image sub-template in the first image template is adjusted to display an animation effect. For example, the electronic device may adjust the second image template, that is, the animation effect is realized by controlling the created second image template to "vanish". For example, when 32 second image sub-templates in the second image template are controlled, the second image template is not displayed in a default state. In a case of playing animation, the second image template is set to a display state and the first candidate image in the first image template is assigned to the second image template, that is, the candidate sub-image in each first image sub-template in the first image template is assigned to the corresponding second image sub-template in the second image template sequentially. At the same time, the electronic device may obtain a second candidate image and assign the second candidate image to the first image template.

The electronic device may adjust the display parameter of each second image sub-template in the second image template according to a preset sequence, that is, animation processing such as scaling down and gradual change of transparency are performed for UI element images of UnityEngine UI assigned with images.

That is, the electronic device may temporarily store a to-be-displayed candidate image through the first image template, and during a display process, assign the first candidate image in the first image template to the second image template and adjust the second image template, so as to achieve the effect of displaying the first candidate image using a preset effect.

Figure 8:
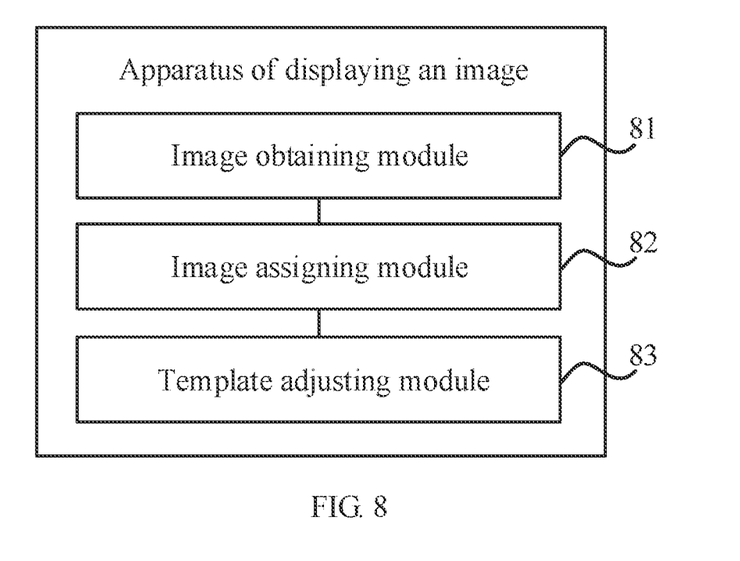
FIG. 8 is a block diagram of an apparatus of displaying an image according to an embodiment of the present disclosure.

FIG. 8 is a block diagram of an apparatus of displaying an image according to an embodiment of the present disclosure. As shown in FIG. 7, the apparatus includes an image obtaining module 81, configured to obtain a preset number of candidate sub-images by segmenting a to-be-displayed first candidate image; an image assigning module 82, configured to assign each of the candidate sub-images to a corresponding first image sub-template in a preset first image template sequentially, where a number of the first image sub-templates is equal to a number of the candidate sub-images; a template adjusting module 83, configured to adjust each of the first image sub-templates in the preset first image template such that the first candidate image displays a preset animation effect, where the preset animation effect is obtained from configuration information of an electronic device.

In an embodiment, the template adjusting module includes: a sub-image assigning unit, configured to assign the candidate sub-image in each of the first image sub-templates in the first image template to a corresponding second image sub-template in a preset second image template sequentially, where each of the second image sub-templates in the second image template corresponds one-to-one to each of the first image sub-templates in the first image template; a sequence and parameter obtaining unit, configured to obtain an adjustment sequence and a display parameter of each of the second image sub-templates in the second image template based on the preset animation effect; and a display parameter adjusting unit, configured to adjust the display parameter of each of the second image sub-templates in the second image template sequentially based on the adjustment sequence.

In an embodiment, the sub-image assigning unit includes: a display state adjusting sub-unit, configured to adjust each of the second image sub-templates in the second image template to a display state; a sub-image assigning sub-unit, configured to assign the candidate sub-image in each of the first image sub-templates in the first image template to the corresponding second image sub-template in the second image template sequentially.

In an embodiment, the apparatus further includes: the image obtaining module, further configured to obtain a to-be-displayed second candidate image, and the image assigning module, further configured to segment the second candidate image and assign a preset number of obtained candidate sub-images to corresponding first image sub-templates in the first image template sequentially.

In an embodiment, the display parameter includes at least one of a scaling coefficient, a display coordinate and a transparency.

In an embodiment, the adjustment sequence includes at least one of; adjusting based on a row sequence, adjusting based on a column sequence, adjusting based on a zigzag sequence, simultaneously adjusting based on a sequence of from left and right toward middle, moving out of a display boundary from a current position, adjusting based on a sequence of from one vertex corner to an opposite corner, adjusting and moving out of the display boundary simultaneously.

It is understood that the apparatuses according to the embodiments of the present disclosure correspond to the above methods and relevant contents of the apparatuses may be known from the contents of various embodiments of the above methods and thus will not be repeated herein.

In an exemplary embodiment, there is provided an electronic device, including a processor and a memory storing computer programs executable by the processor, where the processor is configured to execute the computer programs in the memory to implement the steps of the above methods.

In an exemplary embodiment, there is further provided a non-volatile computer readable storage medium including executable computer programs, for example, a memory including instructions. The above executable computer programs may be executed by a processor to implement the steps of the above methods. The readable storage medium may be read only memory (ROM), random access memory (RAM). CD-ROM, magnetic tape, floppy disk, optical data storage device and the like.

Other implementations of the present disclosure will be apparent to those skilled in the art from consideration of the specification and practice of the present disclosure herein. The present disclosure is intended to cover any variations, uses, adaptive modification of the present disclosure that follow the general principles thereof and include common knowledge or conventional technical means in the related art that are not disclosed in the present disclosure. The specification and examples are considered as exemplary only, with a true scope and spirit of the present disclosure being indicated by the following claims.

It is to be understood that the present disclosure is not limited to the precise structure described above and shown in the accompanying drawings, and that various modifications and changes may be made without departing from the scope thereof. The scope of the present disclosure is limited only by the appended claims.

What is claimed is:

1. A method of displaying an image, comprising:
   obtaining a preset number of candidate sub-images by segmenting a to-be-displayed first candidate image;
   sequentially assigning each of the candidate sub-images to a corresponding first image sub-template in a preset first image template, wherein a number of the first image sub-templates is equal to a number of the candidate sub-images;
   adjusting each of the first image sub-templates in the first image template such that the first candidate image displays a preset animation effect, wherein the preset animation effect is obtained from configuration information of an electronic device;
   wherein adjusting each of the first image sub-templates in the first image template comprises:
   assigning the candidate sub-image in each of the first image sub-templates in the first image template to a corresponding second image sub-template in a preset second image template sequentially, wherein each of the second image sub-templates in the second image template corresponds one-to-one to each of the first image sub-templates in the first image template;
   obtaining an adjustment sequence and a display parameter of each of the second image sub-templates in the second image template based on the preset animation effect;
   adjusting the display parameter of each of the second image sub-templates in the second image template sequentially based on the adjustment sequence.

2. The method according to claim 1, wherein assigning the candidate sub-image in each of the first image sub-templates in the first image template to the corresponding second image sub-template in the preset second image template sequentially comprises:
   adjusting each of the second image sub-templates in the second image template to a display state;
   assigning the candidate sub-image in each of the first image sub-templates in the first image template to the corresponding second image sub-template in the second image template sequentially.

3. The method according to claim 2, wherein after assigning the candidate sub-image in each of the first image sub-templates in the first image template to the corresponding second image sub-template in the second image template sequentially, the method further comprises:
  obtaining a to-be-displayed second candidate image;
  segmenting the second candidate image to assign a preset number of obtained candidate sub-images to corresponding first image sub-templates in the first image template sequentially.

4. The method according to claim 1, wherein the display parameter comprises at least one of:
  a scaling coefficient, a display coordinate and a transparency.

5. The method according to claim 1, wherein the adjustment sequence comprises at least one of:
  adjusting based on a row sequence,
  adjusting based on a column sequence,
  adjusting based on a zigzag sequence,
  simultaneously adjusting based on a sequence of from left and right toward middle,
  moving out of a display boundary from a current position,
  adjusting based on a sequence of from one vertex corner to an opposite corner,
  adjusting and moving out of the display boundary simultaneously.

6. An electronic device, comprising:
  a processor;
  a memory storing computer programs executable by the processor;
  wherein the processor is configured to execute the computer programs in the memory to implement operations comprising:
    obtaining a preset number of candidate sub-images by segmenting a to-be-displayed first candidate image;
    sequentially assigning each of the candidate sub-images to a corresponding first image sub-template in a preset first image template, wherein a number of the first image sub-templates is equal to a number of the candidate sub-images;
    adjusting each of the first image sub-templates in the first image template such that the first candidate image displays a preset animation effect, wherein the preset animation effect is obtained from configuration information of the electronic device;
    wherein adjusting each of the first image sub-templates in the first image template comprises:
    assigning the candidate sub-image in each of the first image sub-templates in the first image template to a corresponding second image sub-template in a preset second image template sequentially, wherein each of the second image sub-templates in the second image template corresponds one-to-one to each of the first image sub-templates in the first image template;
    obtaining an adjustment sequence and a display parameter of each of the second image sub-templates in the second image template based on the preset animation effect;
    adjusting the display parameter of each of the second image sub-templates in the second image template sequentially based on the adjustment sequence.

7. The electronic device according to claim 6, wherein the operations comprise:
  adjusting each of the second image sub-templates in the second image template to a display state;
  assigning the candidate sub-image in each of the first image sub-templates in the first image template to the corresponding second image sub-template in the second image template sequentially.

8. The electronic device according to claim 7, wherein the operations further comprise:
  obtaining a to-be-displayed second candidate image;
  segmenting the second candidate image to assign a preset number of obtained candidate sub-images to corresponding first image sub-templates in the first image template sequentially.

9. The electronic device according to claim 6, wherein the display parameter comprises at least one of:
  a scaling coefficient, a display coordinate and a transparency.

10. The electronic device according to claim 6, wherein the adjustment sequence comprises at least one of:
  adjusting based on a row sequence,
  adjusting based on a column sequence,
  adjusting based on a zigzag sequence,
  simultaneously adjusting based on a sequence of from left and right toward middle,
  moving out of a display boundary from a current position,
  adjusting based on a sequence of from one vertex corner to an opposite corner,
  adjusting and moving out of the display boundary simultaneously.

11. A non-volatile computer readable storage medium, wherein executable computer programs stored in the storage medium are executed by a processor to implement the operations comprising:
  obtaining a preset number of candidate sub-images by segmenting a to-be-displayed first candidate image;
  assigning each of the candidate sub-images to a corresponding first image sub-template in a preset first image template sequentially, wherein a number of the first image sub-templates is equal to a number of the candidate sub-images;
  adjusting each of the first image sub-templates in the first image template such that the first candidate image displays a preset animation effect, wherein the preset animation effect is obtained from configuration information of an electronic device;
  wherein adjusting each of the first image sub-templates in the first image template comprises:
  assigning the candidate sub-image in each of the first image sub-templates in the first image template to a corresponding second image sub-template in a preset second image template sequentially, wherein each of the second image sub-templates in the second image template corresponds one-to-one to each of the first image sub-templates in the first image template;
  obtaining an adjustment sequence and a display parameter of each of the second image sub-templates in the second image template based on the preset animation effect;
  adjusting the display parameter of each of the second image sub-templates in the second image template sequentially based on the adjustment sequence.

12. The storage medium according to claim 11, wherein the operations comprise:
  adjusting each of the second image sub-templates in the second image template to a display state;
  assigning the candidate sub-image in each of the first image sub-templates in the first image template to the corresponding second image sub-template in the second image template sequentially.

13. The storage medium according to claim 12, wherein the operations further comprise:
  obtaining a to-be-displayed second candidate image;

segmenting the second candidate image to assign a preset number of obtained candidate sub-images to corresponding first image sub-templates in the first image template sequentially.

14. The storage medium according to claim 11, wherein the display parameter comprises at least one of:
a scaling coefficient, a display coordinate and a transparency.

15. The storage medium according to claim 11, wherein the adjustment sequence comprises at least one of:
adjusting based on a row sequence,
adjusting based on a column sequence,
adjusting based on a zigzag sequence,
simultaneously adjusting based on a sequence of from left and right toward middle,
moving out of a display boundary from a current position,
adjusting based on a sequence of from one vertex corner to an opposite corner,
adjusting and moving out of the display boundary simultaneously.

* * * * *